March 29, 1955 W. K. OWEN 2,705,120
PALLET
Filed June 7, 1949 2 Sheets-Sheet 1
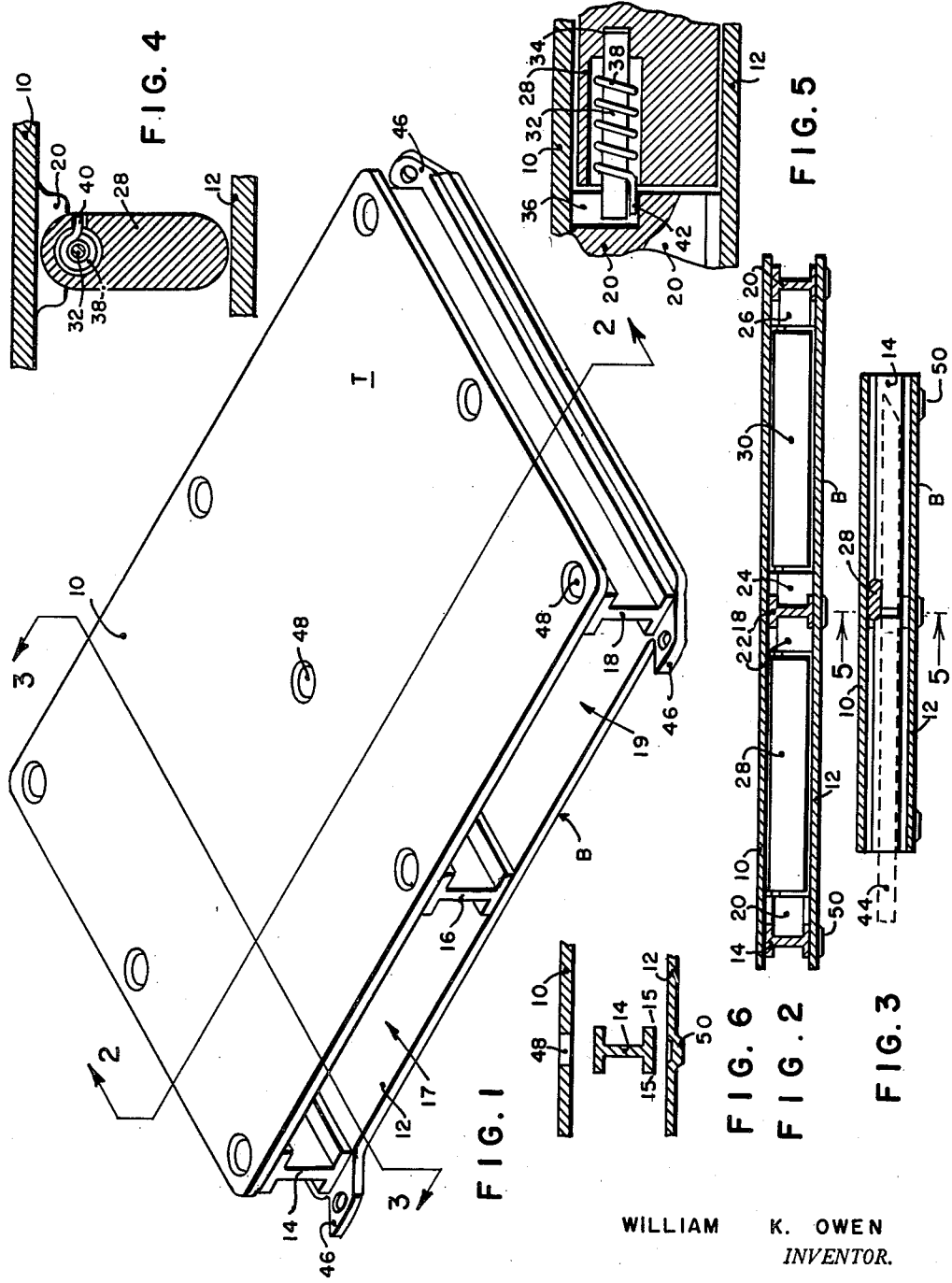
WILLIAM K. OWEN
INVENTOR.
BY
*Erwin D. Johnson*
ATTORNEY March 29, 1955 W. K. OWEN 2,705,120
PALLET Filed June 7, 1949 2 Sheets-Sheet 2

WILLIAM K. OWEN
*INVENTOR.*

BY
*ATTORNEY*

United States Patent Office 2,705,120
Patented Mar. 29, 1955

2,705,120

PALLET

William K. Owen, Oakland, Calif., assignor to Donald L. Herzer, Ramona, Calif.

Application June 7, 1949, Serial No. 97,565

5 Claims. (Cl. 248—120)

This invention is a pallet upon which crates, etc., are placed for handling and storage. The handling and storage of freight in warehousing and shipping is greatly facilitated by pallets. By their use the crates and boxes of merchandise are relieved of destructive lifting strains, and the time consumed in loading the crates on slings and trucks for moving and stacking is reduced to a minimum.

In marine warehousing and shipping practice it is desirable to place a crate or assembly of crates on a pallet and to leave the crates on the pallet continually until the travel of the shipment is completed. This travel may include (1) the transfer into temporary storage in a warehouse, (2) shifting within the warehouse to enable warehousemen to add and/or remove other shipments, (3) transfer from the warehouse to the dock by a fork truck or the like, and (4) transfer from the dock to the hold of a vessel by means of a hoist rig. All four of the above movements are repeated upon unloading the ship.

In addition to the advantages of the use of pallets, there are disadvantages. The pallets themselves take up valuable cargo and warehousing space. Often they must be returned to the point of origin without functioning as pallets but merely as freight. The space taken by, and the weight of, the pallets are therefore important considerations and it is one of the objects of this invention to provide a pallet occupying a minimum of space and having little weight.

Another advantage is that this pallet is of strong and durable construction, is capable of withstanding rough handling, and in one modification is capable of knocking down for shipment.

Functional requirements of the pallet are such that each provides a free air space in the total bulk of a ship's hold. All of the pallets in the cargo, together, usually form somewhat continuous passages through the cargo. This is a hazardous condition because the paths form chimneys for fire should it break out, a condition especially bad with wooden pallets, and because free paths exist for rats to infest the cargo.

Figure 7:
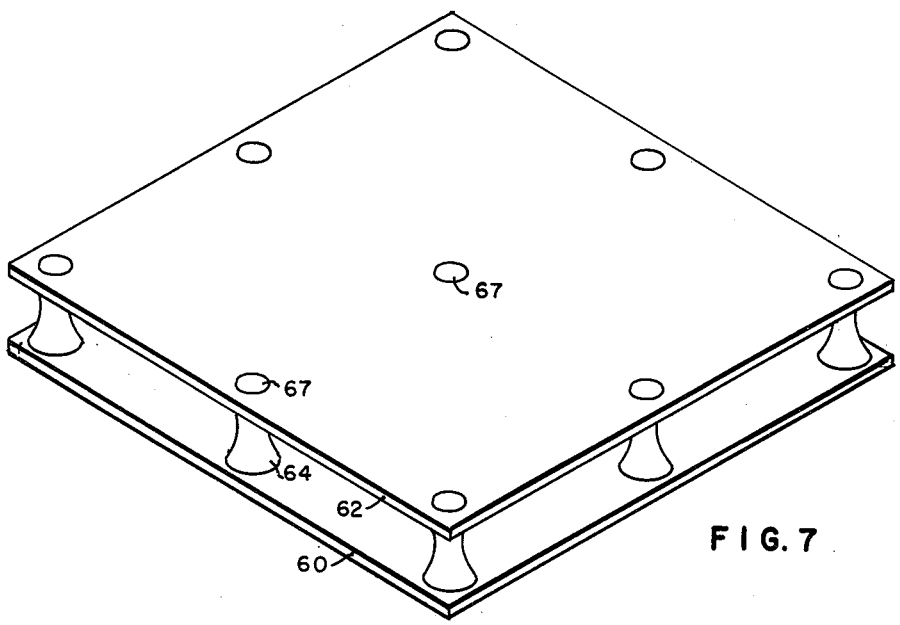
Figure 8:
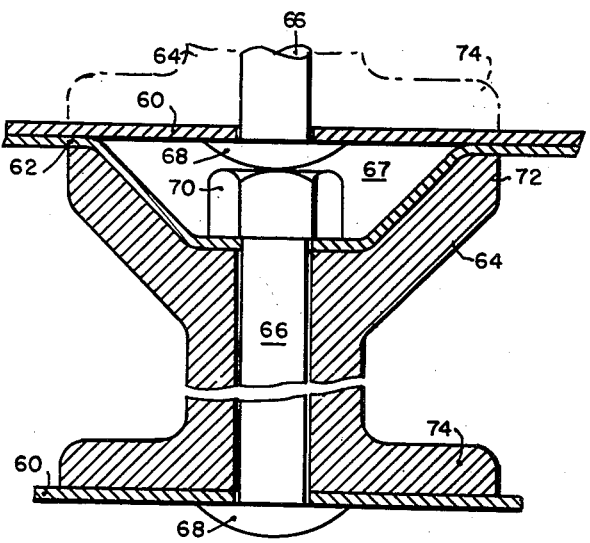

It is another object of my invention to provide a gated pallet which prevents drafts and passage of rats. Other objects of my invention will appear from a consideration of the following specification and accompanying drawing, in which:

Fig. 1 is an isometric view of the new pallet;
Fig. 2 is a section at plane 2—2 of Fig. 1;
Fig. 3 is a section at plane 3—3 of Fig. 1;
Fig. 4 is an enlargement of a fragmentary section of Fig. 3;
Fig. 5 is a fragmentary section at plane 5—5 of Fig. 3;
Fig. 6 illustrates details in the assembly of the parts;
Fig. 7 is an isometric view of a modified pallet; and
Fig. 8 is a fragmentary section showing a detail of Fig. 7.

The pallet comprises rectangular top and bottom plates 10 and 12 of steel or like tough metal of about 3/16 inch thickness. The plates are of about the same rectangular size and shape, as for example, four feet wide by six feet long, and their edges are in registry as shown. The distance from the top T of the top plate to the bottom B of the bottom plate is uniform and of the order of four inches. This distance is maintained and determined by a plurality of I beams 14, 16, and 18, as shown, which extend in parallel across the facing surfaces of the plates on the short dimension and which are disposed one at each end region and one in the middle region of the space between the plates to form a two section, or divided, passage 17 and 19 across the short dimension of the plates. Short sections of similar I beam, 20, 22, 24, and 26 are fastened along the long central axis of the plates to leave a gateway between the near ends of sections 20 and 22 and a similar gateway between I beam sections 24 and 26. The plates and I beams are rigidly welded together.

The gateways are normally closed by metal curtains or vanes 28 and 30 which hang by hinge pins 32 midway between the ends of the passages 17 and 19. Pins 32 are secured in the vanes at 34 as shown and are journalled in the vertical slots 36 in the adjacent I beam section, as section 20. The vanes are normally held in the position of Fig. 4 by gravity and by torsion springs 38 surrounding pin 34 and anchored as at 40 in the vane and at 42 in the adjacent I beam section as in Fig. 5.

As illustrated in Fig. 3, when the two forks 44 of a lifting truck are inserted respectively into the passages 17 and 19, the vanes 28 and 30 are deflected to allow reception of the full length of the fork tines. This insertion is made from either end of the passages. The lower plate 12 is provided with tab portions 46 at the corners, the tabs being provided with holes by which the hooks of a hoisting sling are inserted for lifting a loaded pallet for transfer between dock and ship.

The top face T of the upper plate 10 is provided with several recesses 48, and the bottom face B of plate 12 is provided with a like number of feet 50 in vertical registry with the recesses 48. The feet of one pallet fit into the recesses of a lower one, so that a considerable number of pallets may be stacked and moved together without relative slippage of an upper pallet from a lower one.

As shown in Fig. 6 the feet 50 are formed by punching the metal of plate 12 down. The recesses 48 are initially punched thru the plate 10 as shown.

The method of construction is illustrated in Figs. 5 and 6. The I beams are welded in place on the plate 12 along the edges 15. The vane assemblies are then emplaced as shown in Fig. 5. Plate 10 is now placed in position and welds are made at the inside lower edges of the recess 48 between the plate and the I beams. Welds are also readily effected along the outside edges of I beams 14 and 18 with plate 10, and for limited distances along passages 17 and 19 from their ends.

The modification of Figs. 7 and 8 is designed for smaller loads than that of Figs. 1 through 6, and, for such loads, has several advantages over the rigid construction previously described. This modification provides for complete disassembly of the parts so that the plates of several pallets may be stacked together in a small space, and the separators may be placed in sacks. Thus the total volume is reduced to less than a quarter of that used when the pallets are used for their intended function. The return of the pallets without other cargo is thus much less costly of cargo space. This modification further provides for the engagement thereof by a lift truck approaching it at any side. Oftentimes this makes the difference between having to move several tons of cargo and not doing so, in order to reach a certain portion of it for removal.

In Fig. 7 two plates 60 and 62 are held separated by individual spacers 64 and all are held together by bolts 66 and nuts 70. The upper plate is indented as at 67 to a depth sufficient to receive the nut 70 fully and leave space for the round head 68 to project into recess 67 and to rest upon nut 70.

The spacer 64 is provided with an annular head 72 and foot 74 which extend the spacer to the plates 62 and 60, outside the radius of indentation 67. Thus there is provided a nesting for several of plates 62, since the indented portions of stacked plates 62 are accommodated one within the other. Also, when several of the assembled pallets have been stacked, the bolts 66 of the lower pallets do not carry all of the load above them, but are assisted by the spacers 64 which come into play as the bolts are compressed by the load transmitted by the bolts from above.

It will be noted that the spacers 64 form three rows in each direction along the edges of the square plates 60 and 62, the middle rows crossing at right angles along the central vertical planes perpendicular to the plates. The forks of a fork truck pass between the middle and the outside rows of columns in engaging the pallet from any direction of approach, thus making it possible to lift a column of cargo if only one edge of the pallet is exposed for engagement.

While no fire curtains or gates are seen in Figs. 7 and 8, it will be clear that four such curtains or gates are provided, two in each vertical central plane between the center and outside columns.

I claim:

1. A pallet including a pair of flat plates, a plurality of spacers securing the plates in parallel spaced relation and providing two passages between the plates, gates pivotally mounted within the passages substantially midway between the ends thereof, resilient means biasing the gates to close the passages, said gates being deflectable by fork tines of a lifting truck.

2. A pallet comprising, a face plate, beams secured to the lower side of said plate and spaced from each other to provide along the underside of said plate a space extending from edge to edge of the plate, a gate movably secured in said space, said gate being mounted across and normally closing the passage formed when said pallet rests on a substantially flat surface, said gate being adapted to be opened upon insertion of a lift truck fork into said passage.

3. A pallet including a pair of flat substantially continuous plates, elongated spacers securing the plates in rigidly parallel spaced relation, said spacers being spaced from one another to provide between the plates a continuous passage from edge to edge of the plates, a gate movably secured in said passage, said gate being mounted across and normally closing the passage between its ends and being adapted to be opened upon insertion of a lift truck fork into said passage.

4. A pallet comprising, face plates spaced apart from and parallel to each other, spacing means spacing said plates apart, said plates and spacing means forming a lift truck fork receiving passage, gate means pivotally secured to said plate in said passage and normally closing said passage to be deflected about its pivot upon insertion of a lift truck fork.

5. A pallet as recited in claim 4 wherein resilient biasing means are provided cooperating with said gate to urge said gate to a position normally closing said passage.

References Cited in the file of this patent

UNITED STATES PATENTS

| | | |
|---|---|---|
| 697,237 | Collins | Apr. 8, 1902 |
| 1,905,622 | Angelo | Apr. 25, 1933 |
| 1,934,389 | Ulsh | Nov. 7, 1933 |
| 2,356,326 | Lebus | Aug. 22, 1944 |
| 2,391,420 | Huber | Dec. 25, 1945 |
| 2,444,326 | Baker et al. | June 29, 1948 |
| 2,455,197 | Sullivan | Nov. 30, 1948 |
| 2,486,284 | Horwitz | Oct. 25, 1949 |
| 2,503,022 | Benoist et al. | Apr. 4, 1950 |
| 2,542,129 | Fletcher | Feb. 20, 1951 |
| 2,602,619 | McIntyre | July 8, 1952 |

FOREIGN PATENTS

| | | |
|---|---|---|
| 531,371 | Germany | July 30, 1931 |